United States Patent [19]
Keaton

[11] Patent Number: 5,778,511
[45] Date of Patent: Jul. 14, 1998

[54] SWING APPARATUS AND METHOD

[75] Inventor: Rickey Lynn Keaton, West Union, S.C.

[73] Assignee: Compact Air Products, Inc., Westminster, S.C.

[21] Appl. No.: 405,140

[22] Filed: Mar. 16, 1995

Related U.S. Application Data

[62] Division of Ser. No. 109,581, Aug. 20, 1993, Pat. No. 5,437,440.
[51] Int. Cl.$^6$ ............................................. B23Q 3/08
[52] U.S. Cl. ............................ 29/559; 269/24; 269/32
[58] Field of Search ........................... 269/91–94, 24, 269/27, 32; 92/33; 29/559

[56] References Cited

U.S. PATENT DOCUMENTS

| | | | |
|---|---|---|---|
| 3,572,216 | 3/1971 | Seesody | 269/32 |
| 4,351,516 | 9/1982 | Ersoy et al. | 269/27 |
| 4,508,327 | 4/1985 | Ersoy | 269/27 |
| 4,620,695 | 11/1986 | Vanistendael | 269/24 |
| 5,013,015 | 5/1991 | Fatheree | 269/24 |

Primary Examiner—Robert C. Watson
Attorney, Agent, or Firm—Ralph Bailey

[57] ABSTRACT

An elongated cam (A) fixed centrally at one end longitudinally within a cylinder is inserted within a cavity in an end of a piston rod (C) which has a cam follower (D) positioned therein and fixed against longitudinal movement so as to reduce the length of the stroke necessary to turn a member adjacent the other end of the piston rod through a given angle.

2 Claims, 3 Drawing Sheets

5,778,511

SWING APPARATUS AND METHOD

This is a divisional application of application Ser. No. 08/109,581 filed Aug. 20, 1993 now U.S. Pat. No. 5,437,440.

BACKGROUND OF THE INVENTION

This invention relates to a swing aaparatus and the like having a reduced stroke suitable for use in apparatus where miniaturization is important, and to a method of operating a swing member for reducing the length of the stroke by positioning an elongated, longitudinal cam centrally within the cylinder and providing fixed mounting on the end cap so that the cam is carried within the piston rod.

In accordance with the prior art, an elongated cam is mounted externally of the piston rod so that the piston fills a cylinder such that the cam track is carried adjacent the inner wall of the cylinder. This construction requires a predetermined stroke of the piston to produce a resulting commensurate movement of the clamp or other operating member. Swing clamps of various manufacture have long been provided to the trade, and because of the positioning of the cam track immediately opposite the cylindrical wall, a certain predetermined movement of the piston is required to provide a suitable outward swinging movement to the swing clamp.

Because of trends towards miniature cylinders in the field of robotics, it is desirable to reduce the length of the stroke necessary to produce the desired inward or outward turning movement of the swing apparatus.

Swing clamps are often used in the machine tool industry as well as in the electronic industry as, for example, in positioning circuit boards and other work pieces during manufacture. Many new areas for the apparatus and method hereof may utilize swing members other than clamps.

SUMMARY OF THE INVENTION

Accordingly, it is an important object of this invention to produce a swing clamp having a reduced length of stroke of the piston rod in order to produce the desired turning movement of the clamping apparatus.

Another important object of the invention is to provide a swing clamp having a reduced stroke wherein an elongated longitudinal cam is axially disposed within the cylinder and fixed on one end in such a way that the other end may be received within the hollow end of a piston rod which carries a cam follower for imparting turning movement to the piston rod in response to movement of the cam follower in respect to a cam track which is opposite the inner bore or cavity within the adjacent end of the piston rod.

Another important object of the invention is to provide an improved cam follower for use in connection with a swing clamp and the like wherein a spherical ball is carried within an arcuate seat within a cavity at an end of the piston rod for engaging a cam track within a longitudinal centrally disposed cam.

It is important to note that by thus positioning the ball within the seat, the ball is entrapped against longitudinal movement in respect to the piston rod so that the piston rod moves in respect to the fixed cam member. This is in contrast to the prior art wherein the longitudinal cam is fixedly carried by the piston rod and moves in respect to a cam follower fixed in respect to the cylindrical wall of the cylinder and extends inwardly thereof into the cam tract.

By thus reducing the length of the stroke of the piston, the overall length of the piston may be reduced without increasing the diameter of the cylinder. It has been found that a cylinder constructed in accordance with the invention may be made to produce a given turning movement with approximately one-half the length of the prior art cylinders.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a pair of swing clamps constructed in accordance with the invention illustrating the shortened stroke thereof for engaging and fixing a work piece with respect to a work table and the like;

DESCRIPTION OF A PREFERRED EMBODIMENT

The drawings illustrate a swing clamp having a fluid operated cylinder with end cap and carrying a piston therein. A centrally disposed elongated cam A within the cylinder has a fixed mounting on the end cap. A cam track B extends longitudinally about the circumference of the cam for a distance corresponding substantially to the full length of the stroke of the piston. A piston rod C has an elongated cavity therein opening on one end receiving the elongated cam therein. A mounting on an exterior portion adjacent said one end of the piston rod carries the piston therein. A cam follower D on the piston rod extends into the cavity and into the cam track so as to be fixed against longitudinal movement in respect to the piston rod. A clamp E is carried at a free end of the piston rod exteriorly of the cylinder. Thus, swinging of the clamp occurs during substantially the full longitudinal stroke of the piston rod to reduce the length of said stroke. Preferably the cam follower is a ball mounted in an arcuate seat in an inner surface of the cavity carrying the ball for rotation while preventing longitudinal movement thereof in respect to the piston rod. Alternatively the cam follower may take the form of a fixed projecting member carried by the piston rod extending into the cavity and into the cam track.

By fixing an elongated cam centrally within a cylinder and inserting the cam within an end of a piston rod carrying a cam follower, the method contemplates that the length of the stroke of the piston rod may be reduced.

Figure 1:
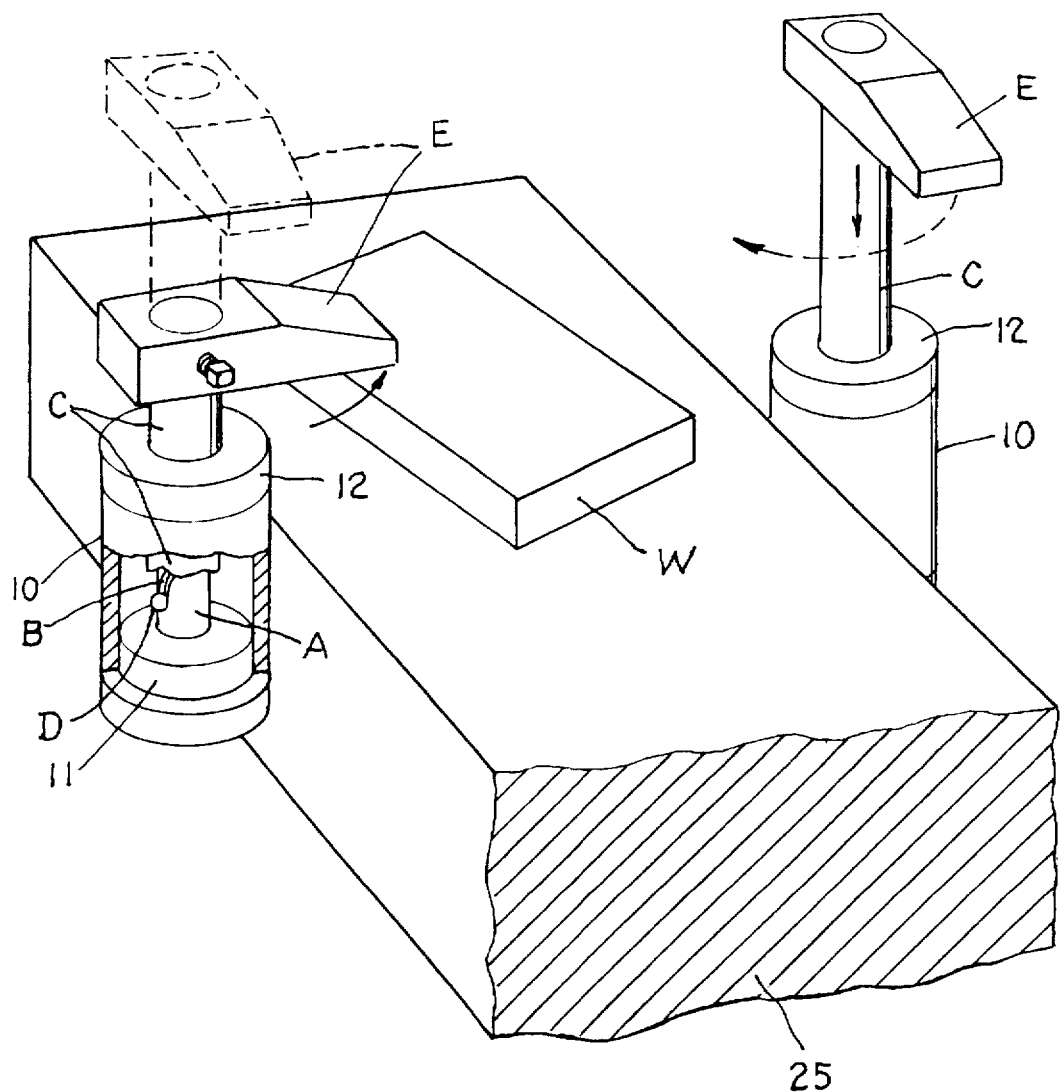
Figure 2:
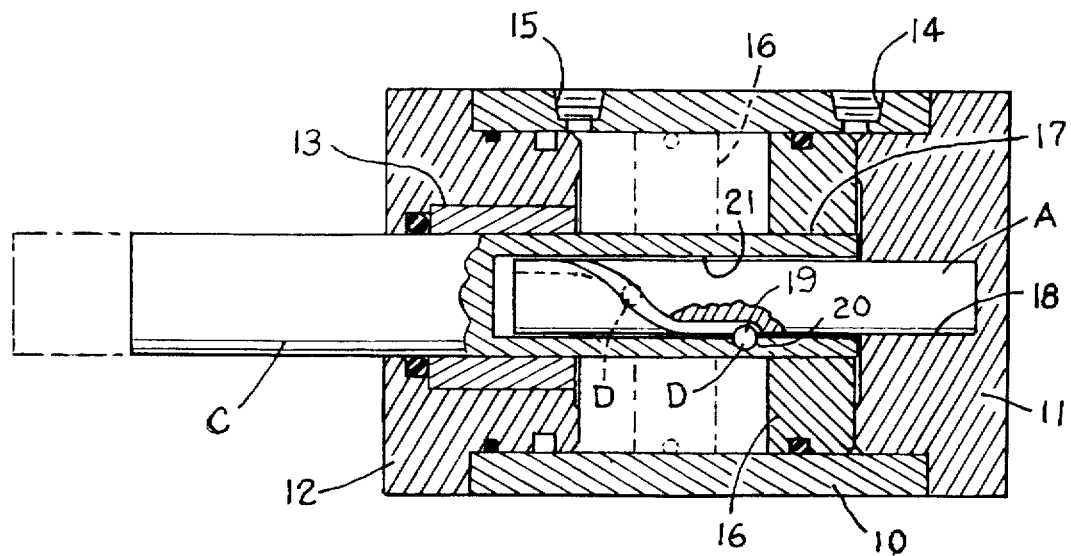
FIG. 2 is a sectional elevation showing a cam follower positioned within a seat within the end of the moveable piston and carried in the track of the centrally positioned longitudinal cam and fixed against longitudinal movement in respect to the piston rod.
Figure 3:
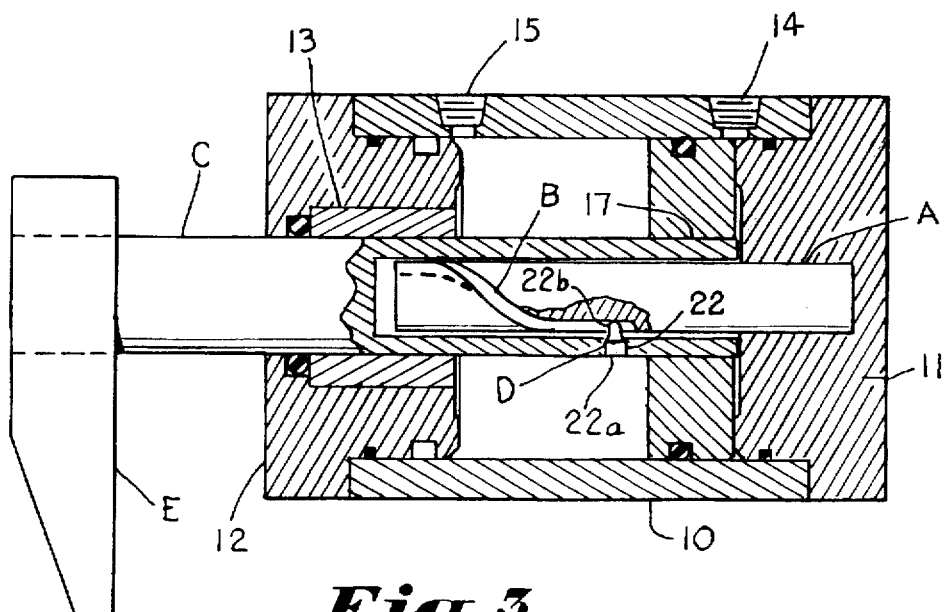
FIG. 3 is a side elevation similar to FIG. 2 illustrating a modified form of the invention wherein a cam follower in the form of a nipple is fixedly carried in relation to an inner wall of the longitudinal central cavity within one end of the piston rod for movement within the cam track of the centrally disposed cam which is fixed against longitudinal movement in respect to the cylinder.

FIGS. 1, 2 and 3 illustrate a swing clamp having a fluid cylinder 10 provided with end cap 11 opposite a head end 12 which has a sleeve bearing 13 for carrying the piston rod C for sliding movement therein. The cylinder 10 has inlet and outlet ports 14 and 15 therein which may be suitable for operating the piston 16 carried upon a suitably threaded mounting 17 carried adjacent an exterior end of the piston rod.

Forceful moving of the piston to initiate a twisting or turning movement of the swing clamp may be accomplished by causing fluid to enter through the port 14 into the area beneath the piston 16 to move the piston toward dotted line position in FIG. 2.

FIG. 2 illustrates the longitudinal centrally disposed elongated cam A as threadably fixed at 18 within the end cap 11. The cam track B extends 90° about the elongated cam and contains a cam follower therein. If the cam follower is a ball 19 carried within the seat 20 within the central inner cavity 21 within the cam shaft, it will be entrapped therein and may not be removed without removal of the piston rod C and is fixed against substantial longitudinal movement with respect to the piston rod.

FIG. 3 illustrates a modified form of the invention wherein a cam follower B is provided in the form of a nipple 22 wherein a base 22a carries an inward projection 22b so as to be received within the cam track. The base 22a is fixed within the wall of the cavity within the piston rod.

It is thus seen that an improved swing clamp or other similar mechanism has been provided wherein a clamp E or other operating member may be maneuvered 90° as over table 25 to clampingly position a work piece W on the table. The clamp is illustrated as being returned to raised or dotted line position on the left hand side of FIG. 1. By thus positioning a fixed elongated centrally disposed cam within a cavity carried within an end of a piston rod, a required turning movement may be accomplished through a relatively shortened stroke thus reducing the required length of the stroke as might be best described by comparing the length of the cylinders in FIGS. 2 and 3 in respect to the prior art cylinder of FIG. 4.

Figure 4:
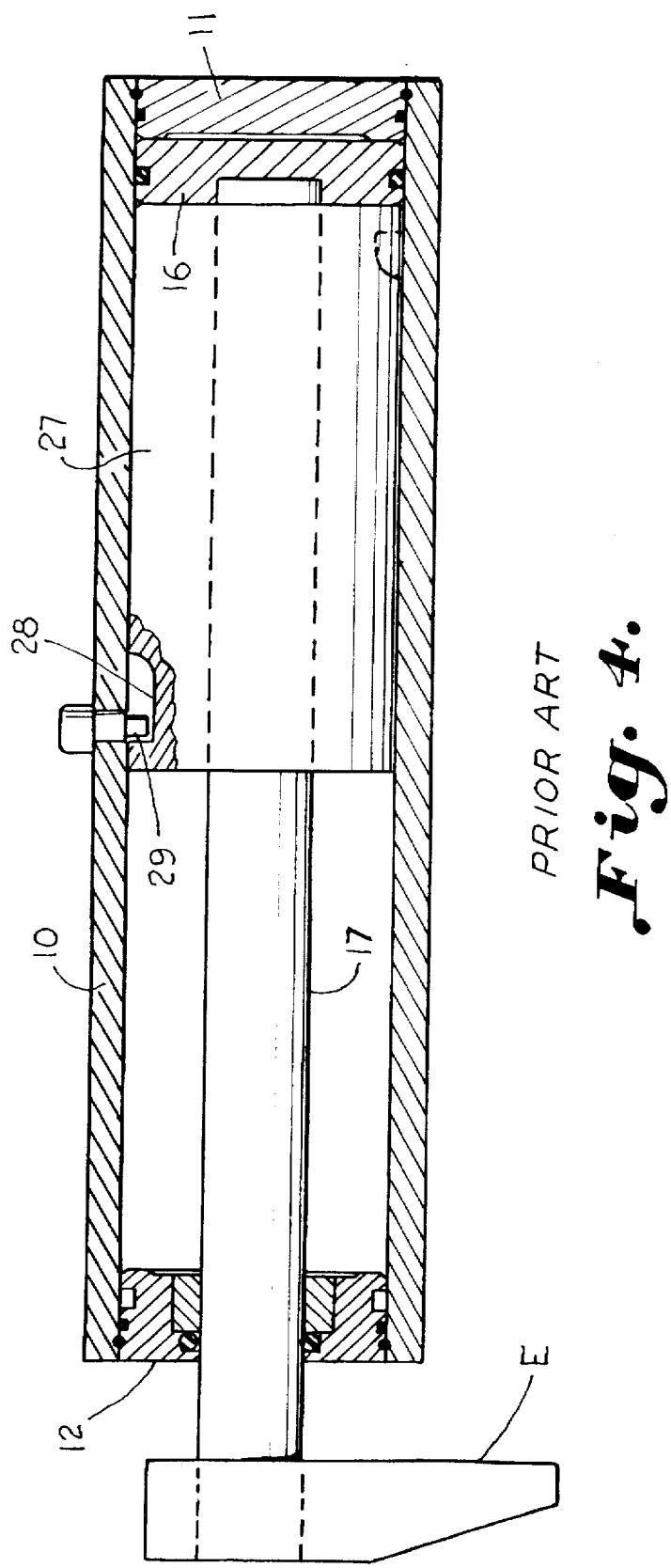
FIG. 4 illustrates a swing clamp constructed in accordance with the prior art wherein the length of the required stroke to produce given turning motion is approximately twice that of a comparable apparatus constructed in accordance with the present invention.

FIG. 4 illustrates a cylinder 10 having an end cap 11 on one end with a head 12 on an opposite end. A piston 16 is carried having a piston rod 17 extending above the head end, and an elongated cam is illustrated at 27 carrying a cam track 28 for receiving a nipple cam follower 29 which has suitable fixed connection with the cylinder wall 10. By thus externally mounting the cam and follower tract as shown in FIG. 4 which exemplifies the prior art, a relatively long longitudinal stroke of the piston is required for imparting swinging movement to the clamp or other operating member E.

While a preferred embodiment of the invention has been described using specific terms, such description is for illustrative purposes only, and it is to be understood that changes and variations may be made without departing from the spirit or scope of the following claims.

What is claimed is:

1. The method of operating a swing apparatus so as to reduce the length of the stroke of a swing member having a fluid operated cylinder with end cap and carrying a piston therein comprising the steps of:

providing a piston in said cylinder;

positioning an elongated cam member axially within the cylinder providing a mounting therefor on said end cap;

providing a piston rod having an elongated cavity therein opening on one end receiving said elongated cam means therein;

mounting said piston on said piston rod;

extending a cam track longitudinally and circumferentially in respect to said cam member for a distance corresponding to substantially the entire length of the stroke of said piston;

providing a cam follower adjacent a forward end of said piston and extending into said cavity and into engagement with said cam track for effecting turning of said piston rod in respect to said cylinder; and providing a mounting for an operator on said piston rod;

whereby swinging of the piston rod occurs during longitudinal movement of the piston rod to reduce the stroke of the piston required to turn said operator by a given amount.

2. The method set forth in claim 1 including the step of mounting ball in an arcuate seat in an inner surface of said cavity carrying said ball for rotation while preventing longitudinal movement thereof in respect to said piston rod.

* * * * *